United States Patent Office 3,637,691
Patented Jan. 25, 1972

3,637,691
CHLOROPYRIDAZINECARBONITRILE COMPOUNDS
Donald E. Bublitz, Concord, Calif., assignor to The Dow Chemical Company, Midland, Mich.
No Drawing. Filed June 6, 1969, Ser. No. 831,216
Int. Cl. C07d 51/04
U.S. Cl. 260—250                                      7 Claims

ABSTRACT OF THE DISCLOSURE

Disclosed as novel compounds are chloropyridazinecarbonitrile compounds substituted by at least one chloro radical and at least one cyano group, the total number of chloro and cyano groups present being 3 or 4. The compounds have utility as fungicides, herbicides and antimicrobials, among other applications.

SUMMARY OF THE INVENTION

The novel compounds of this invention are chloropyridazinecarbonitriles of the formula

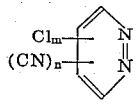

wherein $m$ is an integer having a value of 1, 2 or 3, $n$ is an integer having a value of 1 or 2, and the sum of $m$ and $n$ is 3 or 4. For convenience of description, the compounds corresponding to the above formula will be referred to herein and in the claims as "chloropyridazinecarbonitriles," or more simply as "pyridazine" or "substituted pyridazine" compounds.

The substituted pyridazine compounds of this invention are off-white to yellow solids which are generally insoluble or of low solubility in water and of moderate to high solubility in organic solvents such as acetone, benzene, xylene, ethanol, isopropyl alcohol, dimethylformamide and dimethyl sulfoxide. The compounds of the invention are useful in the control of various fungal, bacterial and parasital pests and as herbicides for the selective control of various weed pests and those growing in an aquatic environment.

The compounds of the present invention can be prepared from the corresponding pyridazinecarboxamide derivatives, usually by treatment with phosphorous oxychloride, with the resulting pyridazine mono- or dicarbonitrile derivatives being subjected to chlorination to form the final product compound when the desired chloro groups are not present in said carbonitrile derivatives. In carrying out the reaction wherein carboxamide groups are converted to carbonitrile groups, the amide is reacted with an excess of phosphorous oxychloride for several hours at temperatures of 160° to 250° C., or at reflux. The reaction mixture is then cooled and the excess phosphoryl chloride is removed in vacuo. The residue, following an intermediate desiccation step, if desired, is freed of POCl₃ as it is taken up in ice water and then neutralized with sodium carbonate. The resulting solution can then be extracted with chloroform, ether or other appropriate organic solvent to obtain the pyridazinecarbonitrile product. Chlorination of the latter can be effected by any one of several methods. Thus, chlorine gas can be bubbled through a melt of the pyridazine carbonitrile compound at 150° to 200° C. for about 1 to 30 hours or more, the progress of the reaction being followed by gas liquid phase chromatography, infrared or mass spectra analysis. In another method, the compound is reacted in the vapor phase with chlorine in the presence of a diluent gas at about 400° to 490° C. for a brief contact time.

The present chloropyridazinecarbonitrile compound(s) can be isolated from the reaction mixture by conventional procedures such as by precipitation in water, washing, extraction, sublimation, solvent extraction and recrystallization. These products can be further purified, if desired, by chromatographic, distillation or other liquid-liquid or vapor-liquid separating and recovery techniques.

The compounds of the present invention can be prepared by adaptation of procedures known to the skilled in the art. Thus, it is to be understood that modifications of other methods known in the art for the preparation of compounds having similar cyano and chloro groupings may be substituted for the above procedures.

DESCRIPTION OF THE PREFERRED EMBODIMENTS

The following examples illustrate the invention but are not to be construed as limiting.

EXAMPLE 1

4,6-dichloro-3-pyridazinecarbonitrile
5,6-dichloro-3-pyridazinecarbonitrile
4,5,6-trichloro-3-pyridazinecarbonitrile A mixture of 50 g. of 6-hydroxy-3-pyridazinecarboxamide and 500 ml. phosphorous oxychloride are carefully heated to reflux temperature and maintained there for 2 hours. The reaction mixture is then cooled and evaporated under vacuum to remove excess phosphorylchloride, and the residue is then poured into ice water. The aqueous system so obtained is repeatedly extracted with chloroform and the combined extracts are dried and evaporated to provide 43 g. of 6-chloro-3-pyridazinecarbonitrile having a melting point of 86° to 88° C. Dry chlorine gas at the rate of 80 cc. per min. is then bubbled for 28 hours through a melt made up of 25 g. of the said carbonitrile compound held at 150° C. At this point analysis of an aliquot portion by gas liquid chromatography (glc) indicates the presence of dichloro-3-pyridazinecarbonitriles along with small amounts of the corresponding trichloro product. The portion of the sample represented by 4,6(and 5,6)-dichloro-3-pyridazinecarbonitrile is separated out by the glc instrument and is found to be a white solid having a melting point of 45° to 76° C. which is substantially insoluble in water and has moderate solubility in acetone and benzene.

The temperature of the reaction mixture is then raised to 200° C. and passage of chlorine gas therethrough is continued for an additional 17 hours, at which point glc analysis indicates that only 4,5,6-trichloro-3-pyridazinecarbonitrile is present as a reaction product. The reaction mixture is subjected to vacuum sublimation to provide 24 g. of a sublimate product having a melting point of 103.0° to 103.5° C. which is identified by glc and infrered spectrum analysis as 4,5,6-trichloro-3-pyridazinecarbonitrile. This analysis is confirmed by elemental analysis which shows the compound to have carbon, hydrogen and nitrogen contents of 28.61, 0.4 and 19.95 percent, respectively, as compared with theoretical contents of said elements in the subject compound of 28.78, 0.0 and 20.15 percent, respectively.

EXAMPLE 2

3,6-dichloro-4-pyridazinecarbonitrile

In this operation, a mixture of 7 g. of 3-hydroxy-6-chloro-4 - pyridazinecarboxamide and 70 ml. of phosphorous oxychloride is stirred for 3 hours as it is heated under reflux conditions. Following this reaction interval, the excess phosphoryl chloride is removed under vacuum and the residue is hydrolyzed as it slowly is added to ice water. A resultant beige colored solid material, as obtained in a 25 percent yield, is removed by filtration. The solid product so recovered, having a melting point of 99° to 101° C., is identified by infrared and mass spectral methods of analysis as 3,6-dichloro-4-pyridazinecarbonitrile.

EXAMPLE 3

3,6-dichloro-4,5-pyridazinedicarbonitrile
3-chloro-4,5-pyridazinedicarbonitrile

A mixture of 2.7 g. of 4,5 - pyridazinedicarboxamide and 50 ml. of phosphorous oxychloride is allowed to stand for 3 hours at room temperatures and is then heated under reflux conditions for 1.5 hours. The excess phosphoryl chloride is removed under vacuum and the residue is dried overnight in a desiccator containing potassium hydroxide pellets. The desiccated material is dissolved in cold water, cooled in a salt-ice bath and then neutralized with sodium carbonate solution. The resulting product is extracted with ether, following which the organic phase is separated, dried and evaporated to provide 1.0 g. of a yellow crystalline material having a melting point of 140° to 142° C. which is identified as 4,5-pyridazinedicarbonitrile. A melt of 0.4 g. of the latter compound is then bubbled with a slow stream of chlorine at 180° to 200° C. for 2 hours. At this point, G.L.C. analysis indicates the presence of two components in addition to the starting material. Each of the said components is trapped in the G.L.C. instrument and identified by means of infrared and mass spectra analysis. The first material eluted is identified as 3-chloro-4,5-pyridazinedicarbonitrile having a melting point of 121° to 123° C., while the second component is identified as 3,6-dichloro - 4,5 - pyridazinedicarbonitrile having a melting point of 183° to 184° C. Said components are off-white to pale yellow in color and each is substantially insoluble in water while having good solubility in acetone and benzene.

EXAMPLE 4

Using the same general method as set forth in Example 3, other pyridazinedicarboxamides are reacted with phosphorous oxychloride to form the corresponding pyridazinedicarbonitriles which are then reacted with chlorine to produce the chloropyridazinedicarbonitrile compounds indicated below:

3,4-pyridazinedicarbonitrile, as produced from 3,4-pyridazinedicarboxamide, is chlorinated to form 6-chloro-3,4-pyridazinedicarbonitrile having a molecular weight of 164.56 and 5,6-dichloro-3,4-pyridazinedicarbonitrile having a molecular weight of 199.

3,6-pyridazinedicarbonitrile, as produced from 3,6-pyridazinedicarboxamide, is chlorinated to produce 4 (or 5)-chloro-3,6 - pyridazinedicarbonitrile having a molecular weight of 164.56 and 4,5-dichloro-3,6-pyridazinedicarbonitrile having a molecular weight of 199.

3,5-pyridazinedicarbonitrile, as produced from 3,5-pyridazinedicarboxamide, is chlorinated to produce 4,6-dichloro-3,5-pyridazinedicarbonitrile having a molecular weight of 199.

The chloropyridazinecarbonitrile compounds of the present invention are useful as pesticides and have particular utility as fungicides and bacteriocides and as selective herbicidal agents for the control of various undesirable weed and aquatic plants. In such applications the pest to be controlled is contacted with a pesticidal amount of one or more of the compounds of the invention. For control of bacterial and fungal pests, the organism is contacted with a pesticidal amount which is also an antimicrobial amount of the compound. For control of weed and aquatic pests, a pesticidal amount which is also an herbicidal amount is employed.

For such uses the present compounds can be employed in an unmodified form or dispersed on a finely divided solid and employed as dust. Such mixtures can also be disersed in water with or without the aid of a surface active agent and the resulting aqueous suspensions employed as drenches or sprays. In other procedures, the products are employed as active constituents in solvent solutions, oil-in-water or water-in-oil emulsions, or aqueous dispersions. The augmented compositions are adapted to be formulated as liquid or solid concentrates and subsequently diluted with additional liquid or solid adjuvants to produce the ultimate treating composition. All such ingredients and adjuvants cooperate with the active component so as to facilitate the invention and obtain an improved and outstanding result. Suitable emulsifiable liquid concentrates are formulations of the active pyridazine compound in a suitable organic solvent therefor such as alcohols, alkyl ethers of glycols and polyglycols, ketones, aromatics and petroleum distillates, together with an ionic or non-ionic emulsifying agent or a mixture thereof. Such emulsions are preferably designated such that they are self-dispersing with good stability characteristics. The dusts and dust concentrates can be prepared by dispersing the active toxicant compounds in and on a finely divided inert solid support such as diatomaceous earth, bentonite, fuller's earth, attapulgite and similar clays. For the preparation of wettable powders, the solid carrier may be mechanically ground in admixture with the active component hereof and a surface active dispersing agent.

Any of the foregoing compositions can be distributed so as to contact pests with a pesticidal amount of one or more of the active compounds. This amount depends largely upon the manner of distribution, the type of pest being treated and its extent or severity of development and the degree of control desired or required for any particular purpose. Generally, the effective or pesticidal dosage ranges from 1 to 10,000 or more parts of toxicants per million parts of applied composition. For the control of higher plants in soil, the active pyridazine compounds hereof ordinarily are distributed in soil in amounts of from about 0.1 to 50 lbs. or more per acre so as to contact seeds and emerging seedlings of the vegetation to be controlled. For the control of aquatic growth, the active chemical, with or without an adjuvant, can be incorporated in the aqueous body at levels of from about 0.2 to 100 or more parts per million parts of the aqueous body being treated. For the control of bacteria and of lower plants such as fungal organisms, the active compounds usually are applied to growth media of said organisms in amounts to provide from about 10 or less to about 5,000 or more parts by weight of the active pyridazine compound per million parts of the ultimate treating composition.

In representative operations, 3,6-dichloro-4-pyridazinecarbonitrile is dispersed in warm melted nutrient agar which is then poured into petri dishes and allowed to solidify, the pyridazine compound being employed in an amount sufficient to provide 500 parts by weight thereof per million parts of the ultimate agar composition. The surface of the agar is then inoculated with a variety of bacterial and fungal pest organisms, and the inoculated plates are incubated under conditions conducive to bacterial and fungal growth. Similar check plates in which the agar contains no active pyridazine or other toxicant compound are similarly inoculated and incubated. In such operations, 100 percent inhibition and control is obtained of the organisms *Pseudomonas aeruginosa*, *Staphylococcus aureus*, *Escherichia coil*, *Candida albicans*, *Trichophton mentagrophytes*, *Bacillus subtilis*, *Aerobacter aerogenes*, *Aspergillus terreus*, *Candida pelliculosa*, *Pullularia pullulans*, *Salmonella typhosa*, *Pseudomonas* species strain 10, *Bacterium, acid fast*, and *Rhizopus nigricans*.

In similar tests wherein the chemicals 4,6-dichloro-3-pyridazinecarbonitrile and 5,6 - dichloro-3-pyridazinecarbonitrile are each admixed in agar solutions, 100 percent inhibition and control is obtained of the organisims *Trichophton mentagrophytes* and *Pullularia pullulans* at a level of one part per million, of the organisms *Candida* albicans, Aspergillus terreus, Candida pelliculosa, Salmonella typhosa and Rhizopus nigricans at a level of 10 parts per million, of the organisms staphylococcus aureous, Escherichia coli, Bacillus substilis, Aerobacter aerogenes and Bacterium, acid fast at a level of 100 parts per million and of the organisms Pseudomonas aeruginosa and Pseudomonas species strain 10 at a level of 500 parts per million.

With other agar tests incorporating 4,5,6-trichloro-3-pyridazinecarbonitrile as the active chemical, complete control is obtained of the organisms Candida albicans, Trichophton mentagrophytes, Bacillus subtilis, Aspergillus terreus, Candida pelliculosa, Pullularia pullulans, Salmonella typhosa, Rhizopus nigricans and Bacaerium, acid fast at a level of 100 parts per million, while similar control is obtained of the organisms Staphylococcus aureus, Escherichia coli, Aerobacter aerogenes and Pseudomonas species strain 10 at a level of 500 parts per million.

With the agar compositions containing 3,6-dichloro-4,5-pyridazinedicarbonitrile and 3-chloro-4,5-pyridazinedicarbonitrile it is found that complete control is obtained of Pseudomonas aeruginosa, Trichophton mentagrophites and Bacillus subtilis at an active chemical concentration of 100 parts per million, and of Staphylococcus aureus, Escherichia coli, Candida albicans, Aerobacter aerogenes, Aspergillus terreus, Candida pelliculosa, Pullarlia pullulans, Salmonella typhosa, Pseudomonas species strain 10 and Rhizopus nigricans at a concentration of 500 parts per million of active chemical. In these and all the foregoing tests, abundant growth of all the test organisms is observed with the check plates containing no active chemical.

In representative operations, either 4,5,6-trichloro-3-pyridazinecarbonitrile or 4,6 (and 5,6)-dichloro-3-pyridazinecarbonitrile in an aqueous emulsified composition containing about 100 parts by weight of the active compound per million parts of the aqueous composition, when applied as a soil drench at a dosage rate of 10 lbs. of active chemical per acre, provides between 90 and 100 percent control of fertile soil planted with pig weed. Similarly, in the control of the aquaticpests elodea, cabomba, moneywort and milfoil, each of these active chemicals gives 100 percent control of the named species at a concentration of one part per million, or less, per million parts of the aqueous plant-supporting medium.

The chemical 4,5,6-trichloro-3-pyridazinecarbonitrile gives 100 percent control of the weed pest spiny clotbur when applied thereto in the form of an aqueous spray emulsion containing 4,000 parts per million of active chemical, and 4,6 (and 5,6)-dichloro-3-pyridazinecarbonitrile gives complete control of the weed pest yellow foxtail when similarly sprayed thereon at a concentration of 4,000 parts per million. The latter chemical also gives complete control of the southern army worm at a concentration of 500 parts per million and of the lone star tick at a level of 5,000 parts per million.

When applied at a dosage level of from about 100 to 5,000 parts per million, each of the compounds of the present invention, the utility of which is not specifically recited above, has the ability to kill, inhibit or otherwise control one or more of the aforesaid or other fungal, bacterial, parasital, weed or aquatic pests.

The pyridazine mono- and dicarboxamide reactant employed as starting materials in preparing the chloropyridazinecarbonitrile compounds of the present invention can be prepared by methods well known to the skilled in the art from the corresponding pyridazine mono- or dicarboxylic acid compounds. In a typical preparation, 32.7 g. of 6-hydroxy-3-pyridazinecarboxylic acid and 2 liters of absolute methanol, previously saturated with hydrogen chloride, are stirred under reflux conditions for 3 hours and then allowed to cool. The precipitate which forms in the mixture is removed by filtration and suspended in methanol, after which the resulting mixture is saturated with ammonia. The mixture is then refluxed for 3 hours, cooled and filtered to provide 25.6 g. of 6-hydroxy-3-pyridazinecarboxamide which can then be converted to 6-chloro-3-pyridazinecarbonitrile by reaction with phosphorous oxychloride, as described in Example 1. Precisely this same method can be followed in preparing 4,5-pyridazinedicarboxamide from pyridazine-4,5-dicarboxylic acid or in preparing 3-hydroxy-6-chloro-4-pyridazinecarboxamide from 3-hydroxy-6-chloro-4-pyridazinecarboxylic acid. Similarly, 3,4-pyridazinedicarboxamide, 3,6-pyridazinedicarboxamide and 2,5-pyridazinedicarboxamide can be prepared in this same manner from the corresponding pyridazinedicarboxylic acid precursors.

I claim:
1. A chloropyridazinecarbonitrile compound of the formula

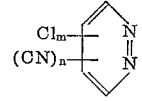

wherein *m* is an integer having a value of 1,2 or 3, *n* is an integer having a value of 1 or 2 and the sum of *m* and *n* is 3 or 4.

2. The compound as defined in claim 1 which is 4,5-dichloro-3-pyridazinecarbonitrile.

3. The compound as defined in claim 1 which is 5,6-dichloro-3-pyridazinecarbonitrile.

4. The compound as defined in claim 1 which is 4,5,6-trichloro-3-pyridazinecarbonitrile.

5. The compound as defined in claim 1 which is 3,6-dichloro-4-pyridazinecarbonitrile.

6. The compound as defined in claim 1 which is 3-chloro-4,5-pyridazinedicarbonitrile.

7. The compound as defined in claim 1 which is 3,6-dichloro-4,5-pyridazinedicarbonitrile.

References Cited
UNITED STATES PATENTS

| | | | |
|---|---|---|---|
| 2,833,766 | 5/1958 | Druey | 260—250 A |
| 3,466,283 | 9/1969 | Bublitz | 260—250 A |

NICHOLAS S. RIZZO, Primary Examiner

U.S. Cl. X.R.

424—250; 71—92